United States Patent
Fleyder et al.

(10) Patent No.: US 9,565,205 B1
(45) Date of Patent: Feb. 7, 2017

(54) DETECTING FRAUDULENT ACTIVITY FROM COMPROMISED DEVICES

(71) Applicant: EMC Corporation, Hopkinton, MA (US)

(72) Inventors: Uri Fleyder, Giv'at Shmuel (IL); Rotem Kerner, Tel Aviv (IL); Zeev Rabinovich, Tel Aviv (IL); Rotem Salinas, Netanya (IL); Lior Ben-Porat, Petah Tikva (IL); Daniel Frank, Giv'at Shmuel (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/667,268

(22) Filed: Mar. 24, 2015

(51) Int. Cl.
*G06F 21/00* (2013.01)
*G06F 11/34* (2006.01)
*H04L 29/06* (2006.01)
*H04L 29/08* (2006.01)
*G06Q 30/02* (2012.01)
(Continued)

(52) U.S. Cl.
CPC ....... *H04L 63/1441* (2013.01); *G06F 11/3485* (2013.01); *G06F 21/316* (2013.01); *G06F 21/552* (2013.01); *G06Q 30/0248* (2013.01); *H04L 12/2618* (2013.01);
(Continued)

(58) Field of Classification Search
CPC .... G06F 21/10; G06F 2201/86; G06F 21/552; G06F 21/56; G06F 21/50; G06F 21/55; G06F 2221/2101; G06F 2221/2151; G06F 21/316; G06F 11/3485; H04L 63/1441; H04L 67/10; H04L 67/22; H04L 12/2618; H04L 29/08675; G06Q 30/0248
See application file for complete search history.

(56) References Cited

U.S. PATENT DOCUMENTS 7,516,220 B1 * 4/2009 Stiert .................. G06F 21/55
709/203
7,539,746 B2 5/2009 Bankier et al.
(Continued)

OTHER PUBLICATIONS

Amsden, Nathaniel, and Cihan Varol. "Malware Detection from a Virtual Machine.", Nov. 2013.*
(Continued)

*Primary Examiner* — Michael Simitoski
(74) *Attorney, Agent, or Firm* — BainwoodHuang

(57) ABSTRACT

A technique for detecting fraudulent activity in a compromised device involves downloading a software application from a processor that controls access to a resource to an electronic device requesting access to the resource. The software application includes instructions that gather selected information from the electronic device such as mouse coordinates and active windows at a selected time and transmitting the information to the processor for analysis. The analysis includes determining whether more than a single input operation is occurring simultaneously. Simultaneous input operations are an improbable combination of processes for a single electronic device, and suggest a potential fraudulent activity. The technique may include sending a message to a security location for further analysis of the potential fraudulent activity, or the user may be contacted while the transaction attempt is delayed, or the attempted transaction operation may be terminated until enhanced security procedures are implemented.

22 Claims, 3 Drawing Sheets

(51) Int. Cl.
*H04L 12/26* (2006.01)
*G06F 21/55* (2013.01)
*G06F 21/31* (2013.01)
*G06Q 30/00* (2012.01)
*H04L 9/32* (2006.01)

(52) U.S. Cl.
CPC ........ *H04L 29/08675* (2013.01); *H04L 67/10* (2013.01); *H04L 67/22* (2013.01)

(56) References Cited

U.S. PATENT DOCUMENTS

| | | | | |
|---|---|---|---|---|
| 8,296,427 | B2* | 10/2012 | Hauser | G06F 21/316 709/223 |
| 8,311,876 | B2* | 11/2012 | House | G06Q 30/02 705/7.29 |
| 8,341,744 | B1* | 12/2012 | Obrecht | G06F 21/41 713/188 |
| 8,627,479 | B2 | 1/2014 | Wittenstein et al. | |
| 8,752,156 | B1 | 6/2014 | van Dijk et al. | |
| 8,756,684 | B2 | 6/2014 | Frantz et al. | |
| 8,832,790 | B1 | 9/2014 | Villa et al. | |
| 8,850,569 | B1* | 9/2014 | Huang | G06F 11/00 726/22 |
| 8,904,538 | B1* | 12/2014 | Glick | G06F 21/56 726/24 |
| 8,959,650 | B1 | 2/2015 | Richards et al. | |
| 8,973,096 | B1 | 3/2015 | Villa et al. | |
| 9,166,995 | B1* | 10/2015 | Roundy | H04L 63/1441 |
| 2003/0217287 | A1* | 11/2003 | Kruglenko | G06F 21/50 726/19 |
| 2006/0136294 | A1* | 6/2006 | Linden | G06Q 30/0257 705/14.47 |
| 2007/0239604 | A1* | 10/2007 | O'Connell | G06Q 30/06 705/50 |
| 2007/0266305 | A1* | 11/2007 | Cong | G06Q 30/02 715/700 |
| 2007/0282955 | A1* | 12/2007 | Lin | G06Q 10/107 709/206 |
| 2008/0301808 | A1* | 12/2008 | Calo | G06F 21/55 726/23 |
| 2009/0024971 | A1* | 1/2009 | Willner | G06Q 30/02 716/106 |
| 2009/0094311 | A1* | 4/2009 | Awadallah | H04L 63/1441 709/202 |
| 2009/0249481 | A1* | 10/2009 | Long | H04L 12/585 726/22 |
| 2010/0070620 | A1* | 3/2010 | Awadallah | H04L 63/1425 709/224 |
| 2010/0262457 | A1* | 10/2010 | House | G06Q 30/02 705/7.29 |
| 2011/0113388 | A1* | 5/2011 | Eisen | G06F 21/32 715/856 |
| 2011/0320816 | A1* | 12/2011 | Yao | G06F 21/316 713/171 |
| 2013/0104227 | A1* | 4/2013 | Dow | G06F 21/31 726/19 |
| 2014/0115662 | A1* | 4/2014 | Johnson | G06F 21/316 726/2 |
| 2014/0325646 | A1* | 10/2014 | Turgeman | G06F 21/316 726/22 |
| 2015/0007325 | A1* | 1/2015 | Eliseev | G06F 21/566 726/24 |
| 2015/0101031 | A1* | 4/2015 | Harjanto | H04L 63/0876 726/7 |
| 2015/0156084 | A1* | 6/2015 | Kaminsky | H04L 43/04 709/224 |
| 2015/0205962 | A1* | 7/2015 | Swidowski | G06F 21/566 726/23 |
| 2016/0080405 | A1* | 3/2016 | Schler | H04L 63/1408 726/23 |

OTHER PUBLICATIONS

Khayam, Syed Ali, Ayesha Binte Ashfaq, and Hayder Radha. "Joint network-host based malware detection using information-theoretic tools." Journal in computer virology 7.2 (2011): 159-172.*

Xu, Kui, et al. "Data-provenance verification for secure hosts." Dependable and Secure Computing, IEEE Transactions on 9.2 (2012): 173-183.*

* cited by examiner

DETECTING FRAUDULENT ACTIVITY FROM COMPROMISED DEVICES

BACKGROUND

Many transactions are performed online over a network between a client and a server. For example, a bank may provide a website on a server so that account holders can access their accounts using a browser application on a client electronic device.

However, some online transactions may be fraudulent, i.e., not initiated by the proper account holder. Frequently, such fraud is perpetuated by the introduction of malware into the client over a communication network, e.g., by an email attachment. Such malware is typically designed to allow a fraudster to control the client using a remote access tool such as Remote Desktop. The malware allows the fraudster to perform functions on the client's electronic device in a manner transparent to the client so that detection by either the client or the website server is difficult.

Conventional approaches to detecting fraud in online transactions involve installing anti-malware software, e.g., anti-virus software, on a client. The anti-malware software typically performs a search on the client's electronic device to detect known malware, e.g., viruses, worms, Trojan horses, etc. Such a search is based upon the most up-to-date knowledge of malware infections.

SUMMARY

Unfortunately, there are deficiencies with the above-described conventional approaches to detecting fraud in online transactions. For example, many users are resistant to installing anti-malware software to detect potential fraudsters because of concerns over side effects such as reduced performance and incompatibility with existing software installed on the electronic device. Further, the anti-malware software must be upgraded and updated frequently since fraudsters constantly change the malware in what is essentially an arms race between the fraudsters and anti-malware software providers.

In contrast to the conventional approaches to detecting fraud in online transactions which may be ineffective and burdensome, improved techniques of detecting fraud involve analyzing activity patterns on a client device to determine whether an improbable set of electronic processes are occurring in the client device. For example, two or more simultaneous mouse locations being detected in the client device suggests that there may be a second entity separate from a legitimate user operating in the client device. In another example, there may be two windows simultaneously active in the client device. Simultaneous input operations are unlikely when only the legitimate user should be operating the client device. By detecting such improbable processes occurring on the client device, the improved technique avoids repeatedly updating the anti-malware software to keep up with changes made by the fraudsters.

One embodiment of the improved techniques is a computer program product having a non-transitory computer readable medium which stores a set of instructions, the set of instructions causing a computerized system to perform a method of detecting a fraudulent transaction attempt in electronic transactions. The method includes receiving a request from a person using an electronic device for an interaction session between the electronic device and a processor device controlling access to a resource. The method also includes receiving information collected from the electronic device according to instructions of a software application running on the electronic device. The method further includes performing an analysis of the information collected from the electronic device to determine if the electronic device is simultaneously processing more than a single input/output activity. The method further includes sending a message to an authorized location when the analysis indicates that an improbable set of processes are occurring in the electronic device.

In some arrangements, the information received may be obtained by the processor device transmitting a software application to the electronic device, including instructions causing the electronic device to collect information from the electronic device at selected times, and transmit the information to the processor device. The collected information may include an ID number of the electronic device, the number of active windows, mouse coordinates and a local time at the electronic device when the mouse coordinates were collected.

Another embodiment of the improved techniques is an electronic apparatus, including a network interface, a memory and processing circuitry coupled to the network interface and the memory. The memory stores instructions which, when carried out by the processing circuitry, cause the processing circuitry to receive a request from an electronic device for an interaction session between the electronic device and the processing circuitry, and receive information from the electronic device. The processing circuitry may then perform an analysis of the information from the electronic device to determine if the electronic device is simultaneously processing more than a single input/output activity, and send a message to an authorized location when the analysis indicates that an improbable set of processes are occurring in the electronic device.

Another example arrangement of the improved techniques includes a method of detecting a fraudulent transaction attempt, including receiving, at a processor device controlling access to a resource, a request from a client using an electronic device for an interaction session between the electronic device and the resource. The method includes receiving, at the processor device, information collected from the electronic device according to the instructions of a software application running of the electronic device, and performing an analysis of the transmitted information to determine if the electronic device is simultaneously performing more than a single input/output activity between the processor device and the electronic device. The method includes and sending, by the processor device, a message to an authorized location when the analysis indicates that the client electronic device maybe processing a fraudulent transaction.

Advantageously, by detecting improbable situations and processes in the user's own electronic device in real time, the improved techniques reduce the need to install up-to-date anti-virus or anti-malware software in the user's machine. The improved techniques provide organizations needing security, such as financial institutions, military and governmental operations with the ability to block a hidden fraudster before financial or other security losses are incurred without inconvenience for the customer.

BRIEF DESCRIPTION OF THE DRAWINGS

The foregoing and other objects, features and advantages will be apparent from the following description of particular arrangement of the invention, as illustrated in the accompanying drawings in which like reference characters refer to the same parts throughout the different views. The drawings are not necessarily to scale, emphasis instead being placed upon illustrating the principles of various arrangement of the invention.

DETAILED DESCRIPTION

Improved techniques of detecting fraud involve analyzing activity patterns on a client device to determine whether an improbable set of electronic processes are occurring in the client device. For example, if two or more simultaneous mouse locations are detected, this suggests that there may be a second entity separate from the legitimate user operating in the legitimate user's electronic device hidden from, and unknown to the legitimate user, such as a hidden, background instance of an additional Desktop. As another example, two or more simultaneously active windows in a single device identification number suggest a potentially fraudulent operation. Simultaneous input operations should not be possible when only the legitimate user is operating the client device. Advantageously, by detecting improbable situations and processes in the user's own electronic device in real time, the improved techniques reduce the need to install up-to-date anti-virus or anti-malware software in the user's machine.

Figure 1:
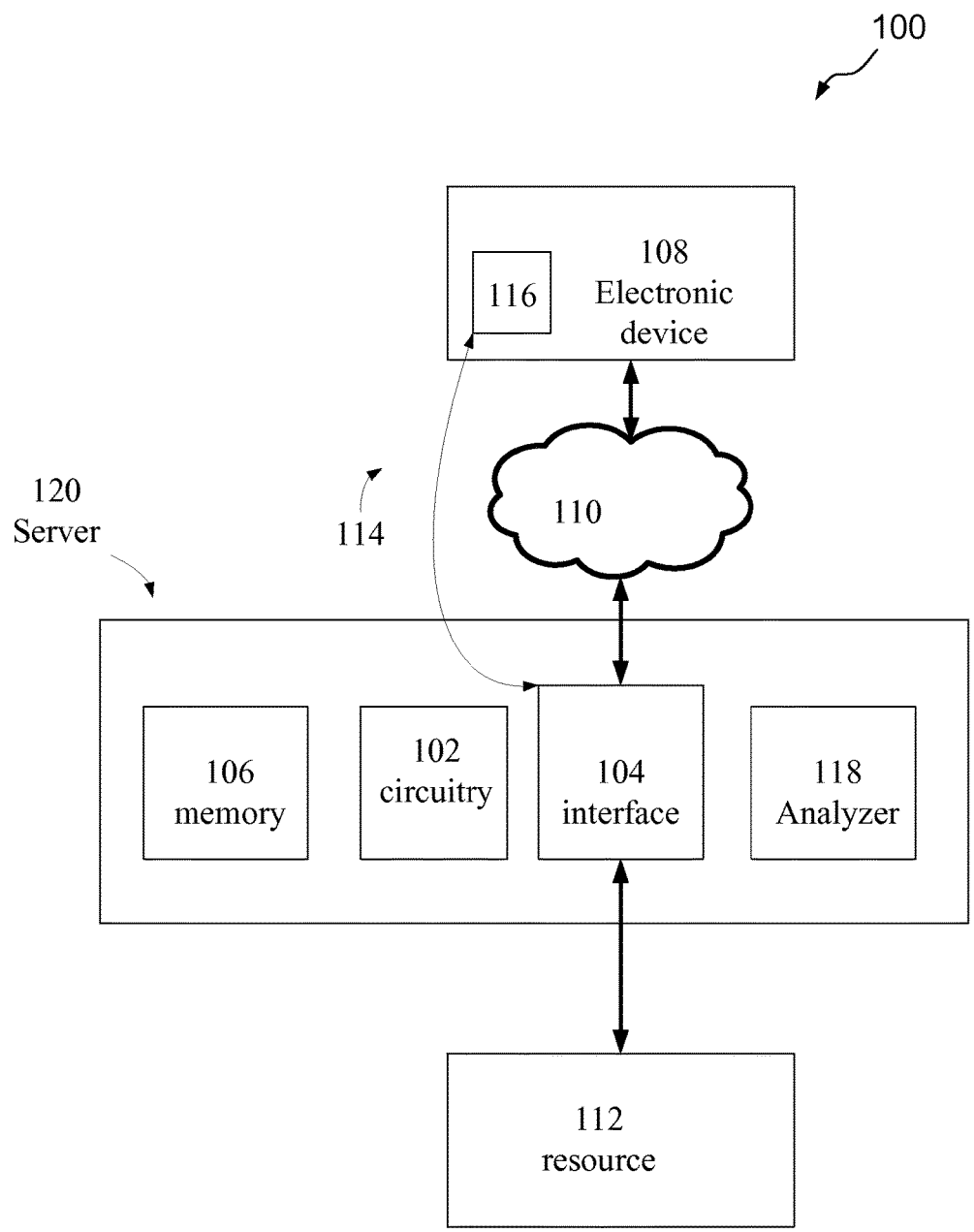
FIG. 1 is a block diagram showing an example arrangement of an electronic device for implementing the improved technique.

FIG. 1 is a block diagram showing an example electronic environment 100 for implementing the improved technique. Electronic environment 100 includes fraud detection server 120, user electronic device 108, and communications medium 110. Fraud detection server 120 includes a network interface 104, a memory 106 and processing circuitry 102 coupled to the network interface and the memory, and a data analyzer 118.

The processing circuitry 102 is configured to communicate with user electronic device 108 via network interface 104 connected to a communications medium 110, such as the Internet. The processing circuitry 102 is further configured to implement software stored in memory 106 that is configured to detect fraudulent attempts to access a resource 112, for example a website, a governmental database or a financial institution.

The memory 106 contains software which, when implemented in processing circuitry, causes the processing circuitry 102 to detect fraudulent attempts to access resource 112 by determining whether there are improbable processes such as simultaneous I/O events running on user electronic device 108. In some arrangements, memory 106 also contains software that causes processing circuitry 102 to perform adaptive authentication to authenticate a user requesting access to resource 112.

Analyzer 118 is configured to receive selected items of information from the electronic device 108 during the course of a transaction with the resource 112 after processing circuitry 102 determines that the electronic device 108 is being operated by a legitimate user. For example, collector 116 may collect mouse coordinates, the number of active windows, the time and the identification number of electronic device 108.

Electronic device 108 is configured to run a browser program for displaying website content through which a legitimate user may access resource 112. Electronic device 108 is further configured to run software through the browser that collects data produced from I/O commands executed on electronic device 108 and transmit that data to fraud detection server 120.

The selected items of information may be obtained from the electronic device 108 in accordance with instructions of a software application running on the electronic device 108. For example, the client using electronic device 108 may have installed the software application at the same time that the client opened an account with resource 112, selected a username and password as well as providing selected secret information, such as mother's maiden name or other identifying information to resource 112. In another arrangement the processing circuitry 102 may respond to the request for an interaction session between the electronic device 108 and the processing circuitry 102 for access to the resource 112 by transmitting a software application from the analyzer 118 to the electronic device 108 including instructions causing the electronic device 108 to collect selected items of information from the electronic device 108 at selected times, and transmit the information to the analyzer 118. The software application may be removed from the electronic device 108 when the transaction with the resource 112 is completed.

The resource 112 is shown in the figure as being a separate device from the processing circuitry 102, but the arrangement is not so limited and processing circuitry 102 may be included as a portion of the resource 112, or vice versa.

During operation, electronic device 108 initiates a request via processor device device 108 to access resource 112. For example, such a request may be initiated through a website access.

Processing circuitry 102 then receives I/O information from electronic device 108 as part of an access session. For example, as the legitimate user formulates the request by moving a mouse and entering information on a keyboard. In these cases, the I/O information includes mouse coordinates, active windows and keystroke data at various times according to electronic device 108.

It should be understood that processing circuitry only receives such I/O data when electronic device 108 is configured to send such data. For example, electronic device 108 runs a software application within a browser application (e.g., a Javascript application) that collects I/O data at various time intervals, e.g., every 10 seconds. When the software application samples the I/O data, it causes electronic device 108 to transmit that data to processing circuitry 102 via communications medium 110. In some arrangements, processing circuitry 102 detects whether the software application is installed on electronic device 108. If software application is not installed, then the processor device performs an installation of the software application on electronic device 108 over communications medium 110. The software application may be removed from electronic device 108 after the request has been granted or denied, or it may be kept on electronic device 108 to run on demand from processing circuitry 102.

Processing circuitry 102 performs an analysis of the information received from the electronic device 108 to determine if the electronic device 108 is simultaneously processing more than a single input/output activity. The processing circuitry 102 may then send a message to an authorized location if the analysis indicates that an improbable set of processes are occurring in the electronic device 108. For example, the authorized location may be a security center including analysts who evaluate proper responses to potential fraudulent activities, or to law enforcement locations.

Improbable processes may include any processes occurring essentially simultaneously that require client input, such as moving a mouse or entering information on a keyboard. For example, the selected items of the information received from the electronic device 108 may include an ID number of the electronic device 108, the identity of active windows, mouse coordinates and a local time at the electronic device 108 when the active windows and mouse coordinates were collected. If the transmitted mouse coordinates show that there are two different mouse locations at the same local time in electronic device 108, then it is improbable that one client using electronic device 108 could have the mouse in two different simultaneous positions, and may indicate a probability of a hidden fraudster.

There may also be other simultaneous processes in the electronic device 108 that can be used to determine the probable presence of a hidden fraudster. Examples of improbable simultaneous processes indicating possible fraud may include multiple input/output actions occurring simultaneously in a single electronic device, two or more simultaneously active windows, simultaneous transmissions of two or more signals occurring over a communication connection (such as the shown internet 110) between the processing circuitry 102 and electronic devices having the same ID number, and two or more simultaneous keyboard entries. In each of these examples processing circuitry 102 may detect fraud without communicating with the client using electronic 108.

Figure 2:
FIG. 2 is a table showing an example of the collected data and data analysis.

FIG. 2 shows a table 200 that contains example selected information collected from electronic device 108 and analysis of that data. The selected information includes a device ID for the electronic device 108, the time at the electronic device 108 when the selected information was recorded, the active window of the electronic device 108 from which the selected information was recorded, and the mouse coordinates in both X and Y axis of the mouse at the time of recording. In FIG. 2, the time increments for recording and transmitting the selected information are shown as every ten seconds, but the arrangement is not so limited and recording intervals may be of any length and in particular may be in the range of from 0.01 seconds to 10 seconds, although such a range may be shorter or longer.

The processing circuitry 102 can analyze selected information such as that shown in this illustration, and may store the information and conclusions of the analysis in the memory 106. This example table of transmitted information shows two different improbable processes occurring in the device labeled User 1. A first illustrative improbable process occurs at 214 and 216, where events 0003 and 0004 both occur in a single device (User 1), for example electronic device 108 of FIG. 1, at the same time, specifically at time 14:25:40.00. In this case the events 0003 and 0004 indicate two different mouse coordinates at the same time in the same device, specifically X=32, Y=322 for event 0003 at 214, and X=16, Y=232 for event 0004 at 216. One legitimate user using one specific device cannot have the mouse in two locations at the same time, and thus this situation indicates that there is a hidden fraudster using the electronic device 108 at the same time as the legitimate client.

A second improbable combination of processes is illustrated at 218 and 220, where events 0005 and 0006 both occur in a single device (User 1), at the same time, specifically 14:25:50.00, but have two different active windows, namely Bank/login at 218 and Bank/trans at 220. Two different active windows operating simultaneously in a single device cannot occur with one legitimate user using one device. Two active window notifications at the same time indicates a hidden fraudster using the electronic device 108 to transfer money from the clients bank account at the same time as the legitimate client is still trying to login to the bank website. In some arrangements the processing circuitry 102 would halt the transfer operation at event 0006 until security was notified.

Figure 3:
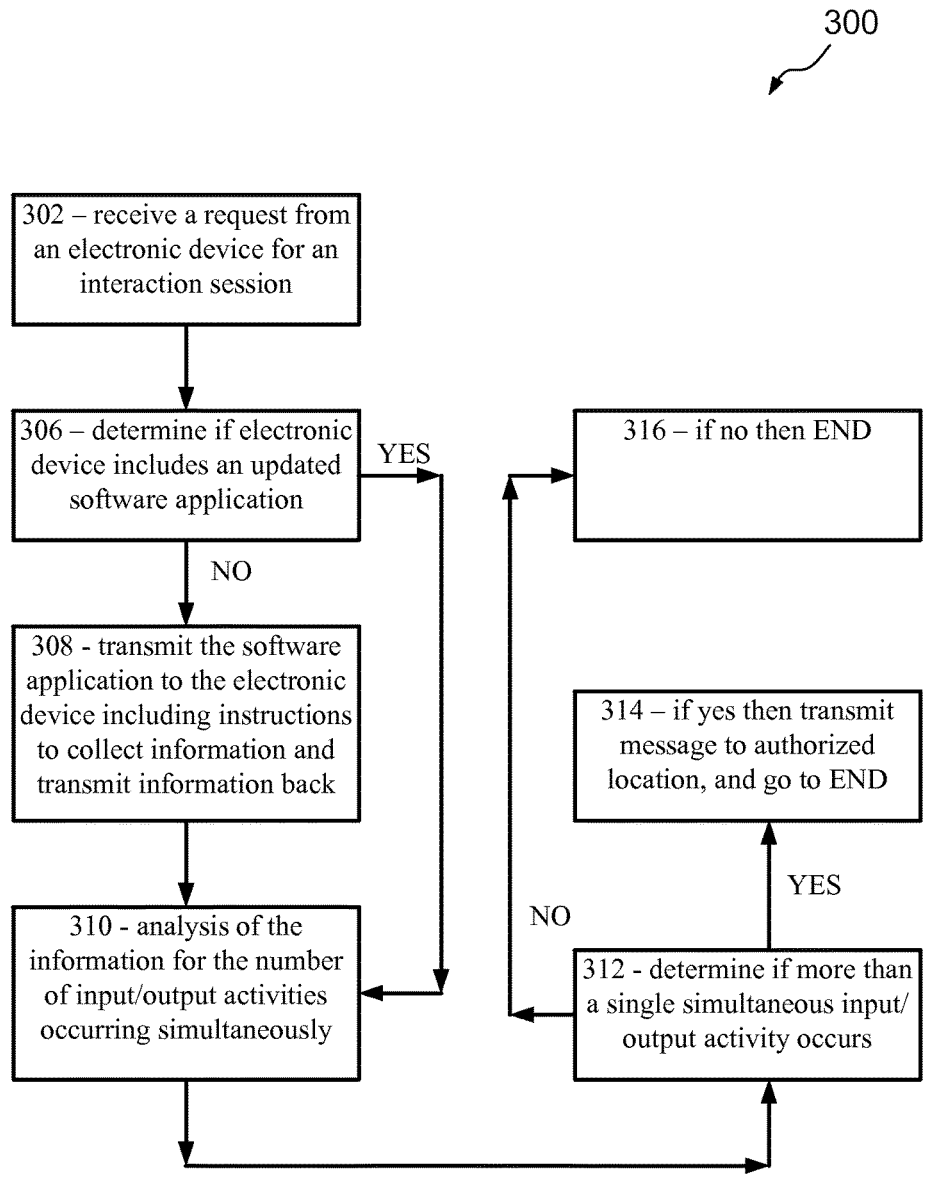
FIG. 3 is a flow chart of a method for implementing the improved technique.

FIG. 3 is a flow chart of one method 300 for implementing the improved technique, the method starting at step 302 by receiving, at a processing circuitry 102 controlling access to a resource, a request from a person using an electronic device 108 for an interaction session between the electronic device 108 and the processing circuitry 102. At step 306 determines whether or not electronic device 108 includes an updated software application that transmits selected information from electronic device 108 to the processing circuitry 102.

If the updated software is not present in electronic device 108, then the method proceed to step 308 where the processing circuitry 102 transmits the software application to the electronic device, the software application including instructions causing the electronic device 108 to collect information from the electronic device at selected times, and transmit the information to the processing circuitry. The method moves to step 310.

If the updated software is present in electronic device 108, then the method proceeds directly to step 310 where the received information undergoes an analysis of the selected information collected from the electronic device to determine if the electronic device 108 is simultaneously processing more than a single input/output activity. The analysis may include the most recently received information as well as previously stored information from the present electronic device and information from other electronic devices either presently in communication with the processing circuitry.

At step 312 if the analysis shows that the electronic device 108 is simultaneously processing more than a single input/output activity the method moves to step 314 where a message is transmitted to an authorized location indicating that an improbable set of processes are occurring in the electronic device and some responsive action may be necessary to ensure security. In some arrangements the processing circuitry 102 may include the type of improbable process as an aid for the authorized location to determine the correct response.

If the analysis shows that the electronic device 108 is not simultaneously processing more than a single input/output activity the method moves to step 316 and ends until restarted by the receiving of subsequent requests for connections and/or subsequent selected information.

As described above, improved arrangements and techniques are directed to detecting fraudulent activity in electronic devices that have been compromised by the action of malware. Compromised electronic devices cannot be easily detected by existing security techniques such as passwords, out of band communication, or adaptive authentication, but can be detected by a determination that more than a single data input of the compromised device is active at the same time. Improved arrangements download a software application to an electronic device requesting an interactive session with a resource such as a bank website, where the downloaded software application transmits information regarding simultaneous input activities in the electronic device for analysis by a monitoring system. With such an arrangement compromised electronic devices may be detected before, during or after a transaction is completed without interfering with client convenience by asking additional security questions, obtaining biometric indications, constantly requiring the client to upgrade their antivirus software, or requiring out of band responses such as codes passed to the client via a cellphone.

Compromised electronic devices may include hand held devices such as smart phones, any electronic device using RF communications channels, any electronic device using wireless or wired communications via a communication network such as the internet, local area networks or the cloud, and any operation having remote nodes that may be sensitive to malware insertion. Such compromised devices may represent a security risk to military and governmental computer networks and databases, as well as for any commercial operation, such as an online sales merchant or financial institution.

While various arrangements of the invention have been particularly shown and described, it will be understood by those skilled in the art that various changes in form and details may be made therein without departing from the spirit and scope of the invention as defined by the appended claims.

What is claimed is:

1. A computer program product having a non-transitory computer readable medium which stores a set of instructions for detecting a fraudulent attempt to access a resource, the set of instructions causing a processor device to perform a method comprising:
   receiving a request from a person using an electronic device for an interaction session between the electronic device and the processor device;
   receiving information collected from the electronic device according to instructions of a software application running on the electronic device;
   performing an analysis of the information collected from the electronic device to determine if the electronic device is simultaneously processing more than a single input/output activity; and
   sending a message to an authorized location when the analysis indicates that an improbable set of processes are occurring in the electronic device;
   wherein sending the message is in response to the analysis indicating that the electronic device provides two or more simultaneous different mouse coordinates.

2. The computer program product of claim 1, wherein the improbable set of processes occurring in the electronic device further includes at least one of multiple input/output actions occurring simultaneously in a single electronic device, two or more simultaneously active windows, and two or more simultaneous keyboard entries.

3. The computer program product of claim 2, wherein the information received from the electronic device includes an identification number of the electronic device, mouse coordinates and a local time at the electronic device when the mouse coordinates were collected.

4. The computer program product of claim 2, wherein the improbable set of processes further includes simultaneous transmissions of signals occurring over a communication connection between the processor device and the electronic device.

5. The computer program product of claim 4 wherein the method further comprises transmitting, by the processor device, the software application to the electronic device, the software application including instructions causing the electronic device to (i) collect information from the electronic device at selected times, and (ii) transmit the information to the processor device.

6. The computer program product of claim 4 wherein the processor device comprises a computer performing financial transactions;
   wherein the computer is constructed and arranged to perform an adaptive authentication process to authorize the person to access the resource; and
   wherein the message to the authorized location includes an option to delay the transaction pending additional authentication information.

7. The computer program product of claim 1 wherein the message directs the authorized location to disable access to the resource in response to a detected multiple active window situation.

8. An electronic apparatus, comprising:
   a network interface;
   memory; and
   processing circuitry coupled to the network interface and the memory, the memory storing instructions which, when carried out by the processing circuitry, cause the processing circuitry to:
      receive a request from an electronic device for an interaction session between the electronic device and the processing circuitry;
      receive information from the electronic device;
      perform an analysis of the information from the electronic device to determine if the electronic device is simultaneously processing more than a single input/output activity; and
      send a message to an authorized location when the analysis indicates that an improbable set of processes are occurring in the electronic device;
   wherein the processing circuitry sends the message in response to the analysis indicating that the electronic device provides two or more simultaneous different mouse coordinates.

9. The electronic apparatus of claim 8, wherein further the instructions cause the processing circuitry to transmit a software application via the communication connection to the electronic device, the software application including instructions to cause the electronic device to (i) collect information from the electronic device at selected times, and (ii) transmit the information to the processing circuitry.

10. The electronic apparatus of claim 8, wherein the improbable set of processes occurring in the electronic device further includes at least one of multiple input/output actions occurring simultaneously in the electronic device, two or more simultaneously active windows, and two or more simultaneous keyboard entries.

11. The electronic apparatus of claim 10, wherein the information received from the electronic device includes an identification number of the electronic device, mouse coordinates and a local time at the electronic device when the mouse coordinates were collected.

12. The electronic apparatus of claim 11 wherein the processing circuitry comprises a computer performing financial transactions;
   wherein the processing circuitry is constructed and arranged to perform an adaptive authentication process to authorize the person to access the resource; and
   wherein the message to the authorized location includes an option to delay the transaction pending additional authentication information.

13. The electronic apparatus of claim 10, wherein the improbable set of processes includes simultaneous transmissions of signals occurring over the communication connection between the processing circuitry and the electronic device.

14. The electronic apparatus of claim 8 wherein the message directs the authorized location to disable access to the resource in response to a detected multiple active window situation.

15. A method of detecting a fraudulent attempt to access a resource, comprising:
   receiving, at a processor device that controls access to the resource, a request from a client using an electronic device for an interaction session between the electronic device and the resource;
   receiving, at the processor device, information collected from the electronic device according to the instructions of a software application running of the electronic device;
   performing, by the processor device, an analysis of the transmitted information to determine if the electronic device is simultaneously performing more than a single input/output activity between the processor device and the electronic device; and
   sending, by the processor device, a message to an authorized location when the analysis indicates that the client electronic device maybe processing a fraudulent transaction;
   wherein sending the message is in response to the analysis indicating that the electronic device provides two or more simultaneous different mouse coordinates.

16. The method of claim 15 wherein receiving, at the processor device, the information collected from the electronic device further includes transmitting, by the processor device, a software application to the electronic device, the software application including instructions that cause the electronic device to (i) collect information from the electronic device at selected times and (ii) transmit the information to the processor device.

17. The method of claim 15 wherein the analysis indicates that there are at least two windows simultaneously active in the electronic device;
   wherein sending the message includes notifying the client using the electronic device that electronic device includes more than one active window.

18. The method of claim 15 wherein the information collected from the electronic device is received by the processor device periodically every second.

19. The method of claim 15 wherein transmitting the information from the client using the electronic device includes transmitting an electronic device identifier, current mouse coordinates, current active windows and a local time.

20. The method of claim 15 further comprising:
   collecting a device identifier, current mouse coordinates, current active windows and a local time from each individual one of a set of electronic devices having an active communication connection with the processor device;
   analyzing device identifier values and the local times; and
   sending the message in response to the analysis resulting in more than one simultaneous active communication connection having a same device identifier.

21. The method of claim 15 wherein the protected resource includes a processor hosting a website.

22. The method of claim 15 wherein the message directs the authorized location to disable access to the resource in response to a detected multiple active window situation.

* * * * *